United States Patent [19]

Aanstad et al.

[11] Patent Number: 4,470,948
[45] Date of Patent: Sep. 11, 1984

[54] SUPPRESSION OF MALFUNCTION UNDER WATER-SOLID CONDITIONS

[75] Inventors: Ola J. Aanstad, Nesoya, Norway; Albert M. Sklencar, West Homestead, Pa.

[73] Assignee: Westinghouse Electric Corp., Pittsburgh, Pa.

[21] Appl. No.: 318,233

[22] Filed: Nov. 4, 1981

[51] Int. Cl.³ .............................................. G21C 7/00
[52] U.S. Cl. .................................... 376/216; 376/217; 376/283
[58] Field of Search ............................ 376/215–217, 376/283

[56] References Cited

U.S. PATENT DOCUMENTS

| | | | |
|---|---|---|---|
| 3,211,622 | 10/1965 | Brown | 376/210 |
| 3,548,866 | 12/1970 | Kaiser et al. | 137/487.5 |
| 3,665,945 | 5/1972 | Ottenstein | 137/487.5 |
| 3,776,249 | 12/1973 | Wailer et al. | 137/487.5 |
| 3,890,992 | 6/1975 | Wotz et al. | 137/487.5 |
| 3,919,720 | 11/1975 | Alliston | 376/217 |
| 3,952,759 | 4/1976 | Ottenstein | 137/487.5 |
| 3,979,255 | 9/1976 | Bulgier et al. | 376/217 |
| 3,984,282 | 10/1974 | Kliemola | 376/216 |
| 4,046,625 | 9/1977 | Musick et al. | 376/217 |
| 4,187,144 | 2/1980 | Mueller et al. | 376/216 |
| 4,275,447 | 6/1981 | Ruiz | 376/216 |
| 4,290,851 | 9/1981 | Ball et al. | 376/217 |

Primary Examiner—Sal Cangialosi
Attorney, Agent, or Firm—Daniel C. Abeles

[57] ABSTRACT

Malfunction under water-solid conditions responsive either to increase in mass flow or increase in heat flow into the reactor coolant is suppressed. The power-actuable reactor-coolant relief valve is opened for increase in reactor-coolant mass influx if the rate of change of coolant pressure exceeds a setpoint during a predetermined interval, if, during this interval, the coolant temperature is less than a setpoint and if the level of the fluid in the pressurizer is above a predetermined setpoint (water-solid state). The interval is set to preclude opening of the relief valve for transients. The relief valve is opened responsive to increased influx of heat to the reactor coolant only while the coolant pump operates for a predetermined interval after it starts, if the level of the fluid in the pressurizer is above a setpoint, if either the difference between the temperature of the secondary fluid in the steam generator and the temperature of the coolant is above a predetermined setpoint or the difference between the temperature of the coolant and of the coolant in the loop seal is greater than a predetermined setpoint and if the coolant temperature is less than the setpoint.

16 Claims, 10 Drawing Figures

SUPPRESSION OF MALFUNCTION UNDER WATER-SOLID CONDITIONS

BACKGROUND OF THE INVENTION

This invention relates to nuclear-reactor power apparatus and has particular relationship to the operation of nuclear reactors under water-solid conditions. In nuclear reactors of the pressurized water type, the coolant, usually water, is at a temperature and pressure near the critical temperature and pressure. Typically the temperature is about 580° F. and the pressure in excess of 2000 pounds per square inch. The pressure is maintained by a pressurizer into which the coolant expands. The coolant flows in a loop through a steam generator which contains a fluid to which the coolant transfers heat. The fluid in the steam generator is here called secondary fluid.

Depending on the number of steam generators in nuclear power apparatus, there may be a corresponding or larger number of reactor coolant loops. There is usually only one pressurizer. During normal operation, the coolant in the pressurizer is at a predetermined water level and above this level there is a bubble or volume of vapor or steam which is essentially a pressure cushion. The desired pressure of the coolant is maintained by the vapor cushion. When the reactor apparatus is shut down, the pressurizer becomes filled with coolant, the coolant rises above a predetermined, highest measureable level confining the bubble to a small volume. When the coolant is above this level, the nuclear-reactor power apparatus is said to be in a water-solid condition. This invention concerns itself particularly with the condition of the power-supply apparatus during shut-down after the control rods have been inserted in the core and the steam has been or is in the process of being vented from the pressurizer. Under these conditions the apparatus components may be hot for a considerable time interval.

The permissible pressure of the coolant for a nuclear reactor is set by Appendix G to 10 CFR 50. Overpressure excursions which exceed this permissible pressure caused by malfunction or operator errors have been experienced during operation of the nuclear-reactor power apparatus in a water-solid condition. Such an overpressure excursion may arise from the addition of mass to the coolant. For example, the letdown valve may be isolated or closed while the coolant-charging pump or pumps continues to operate or the safety injection pump may be inadvertently put into operation. Such overpressure excursions may also occur by reason of addition of heat to the coolant. For example, the pressurizer heaters may be inadvertently energized. Or during shutdown, upon loss of residual heat removal capability, decay heat may be transferred from the core to the coolant. Or with the coolant pump started and a temperature difference between the warmer secondary fluid and the colder coolant, with the secondary fluid of the steam generator at a higher temperature than the coolant. Or between the warmer coolant and the colder coolant cold-leg loop seal, heat may be transferred from the warmer to the colder medium. The latter conditions which occur during cold shut-down of the nuclear-reactor power supply has been found to be a highly significant contributing factor to overpressure occurrences in a water-solid condition.

To mitigate the consequences of water-solid overpressurization of the coolant, the practice, in accordance with the teachings of the prior art, is to open the pressurizer power-operated or power-actuable relief valve. This valve is operated and when open relieves some of the coolant in the pressurizer. The practice in accordance with the teachings of the prior art is to apply the necessary power to open the valve. This practice has proven unsatisfactory. It has been found that the pressure increase in the coolant is not arrested sufficiently in all cases below the limit defined by Appendix G but that the pressure swings above this limit producing the undesired condition.

It is an object of this invention to overcome the disadvantages of the prior art and to provide a method and apparatus in whose practice and use overpressurization in the water-solid state or condition of nuclear-reactor power apparatus shall be effectively suppressed.

SUMMARY OF THE INVENTION

This invention arises from the realization that the tendency, observed in the practice of the prior art, of the pressure in the coolant to overshoot the limit defined by Appendix G in the water-solid condition results from the operating characteristics of the power-actuable relief valve. Predominantly the failure to arrest the transient increase in pressure due to the addition of mass or heat to the coolant below or at the limit defined by Appendix G results from the delay in the valve opening after the the valve has been given a signal to open at setpoint. This delay is caused by the time taken for pressurization of the diaphragm chamber of the valve prior to valve stem movement. During the delay interval, mass or heat continues to be added to the coolant and thus produces the valve set-point pressure overshoot. This pressure overshoot occurs regardless of the number or size of the power-actuable relief valves included in the apparatus. Modification of relief-valve design capable of restricting the pressure overshoot below the limit set in Appendix G has not been proposed.

In accordance with this invention overpressurization of the coolant of nuclear-reactor power apparatus in the water-solid state is effectively suppressed by anticipatory control of the power-actuable relief valve or relief valves. This anticipatory control responds both to mass input and to heat input into the coolant in the water-solid state. For mass input, reliance is placed on the time rate of increase in coolant pressure coupled with other conditions of the apparatus. As a necessary condition for the opening of the power-actuable relief valve, the rate of increase in coolant pressure in the water-solid state must exceed a setpoint for a predetermined time interval sufficient to prevent actuation for normal transients. The other conditions which must be satisfied are that the coolant temperature must be below a prescribed setpoint below which coolant overpressurizations are possible and that the level of the coolant in the pressurizer must be above the setpoint level which marks the possible existence of a water-solid state.

Overpressurization responsive to heat input is also effectively suppressed by anticipation of the overpressure condition before it occurs. The signals relied upon to indicate heat-input overpressurization and to actuate the valve are: reactor-coolant pump start up, coolant temperature, pressure or temperature of the secondary fluid, and the highest indicated pressurizer level above which the a water-solid is possible, herein referred to the water-solid set point. The signals are continuously evaluated only during a predetermined interval after the coolant pump has been started. The evaluation takes place for each reactor-coolant loop and its associated steam generator. The conditions which must be met to identify overpressurization and actuate the relief valve are: the difference in the temperature between the secondary fluid and the coolant exceeds a setpoint or the difference in temperature between the coolant and the coolant pump loop seal exceeds a setpoint, the coolant pump has started to operate but has not been operating for more than a predetermined interval, the water level in the pressurizer is above the setpoint, and coolant temperature is below a setpoint. The secondary fluid temperature may be derived by measuring the temperature directly or by measuring the pressure and converting it to temperature (under vapor-liquid phase equilibrium conditions). The existence of a difference which exceeds the setpoint between the temperature of the secondary fluid and the temperature of the coolant indicates that if the coolant pump is started, heat capable of overpressurizing the coolant will be introduced. The temperature difference is manifested by a logic signal. A similar logic variable can be generated by comparing to a setpoint the temperature of the coolant. The signal indicating that the pump has started is manifested by one or more of the circumstances that:

1. The pump breaker is closed and there is voltage across the pump-supply bus.
2. Bus frequency exists.
3. Pump speed is established.
4. Reactor coolant flow is established.

The signal indicating that the pump has started persists for a predetermined time interval to allow the relief valve to be open until thermal equilibrium is established between the coolant and the secondary fluid. The mass input logic described above augments the pump-started logic and provides a redundant signal for opening of the relief valve for overpressure control later in the transient which produces the overpressure.

The command to actuate the power-actuable relief valve responsive to mass input or heat input or both is impressed on a comparator in the relief-valve control. The command from the proportional plus integral plus derivative controller, normally utilized in the control of coolant pressure of nuclear power supply apparatus is also impressed on this comparator. The comparator responds to the highest of the commands generated to open the relief valve.

BRIEF DESCRIPTION OF THE DRAWINGS

For a better understanding of the invention, both as to its organization and as to its method of operation, together with additional objects and advantages thereof, reference is made to the following description taken in connection with the accompanying drawings, in which.

DETAILED DESCRIPTION OF THE EMBODIMENT

Figure 1:
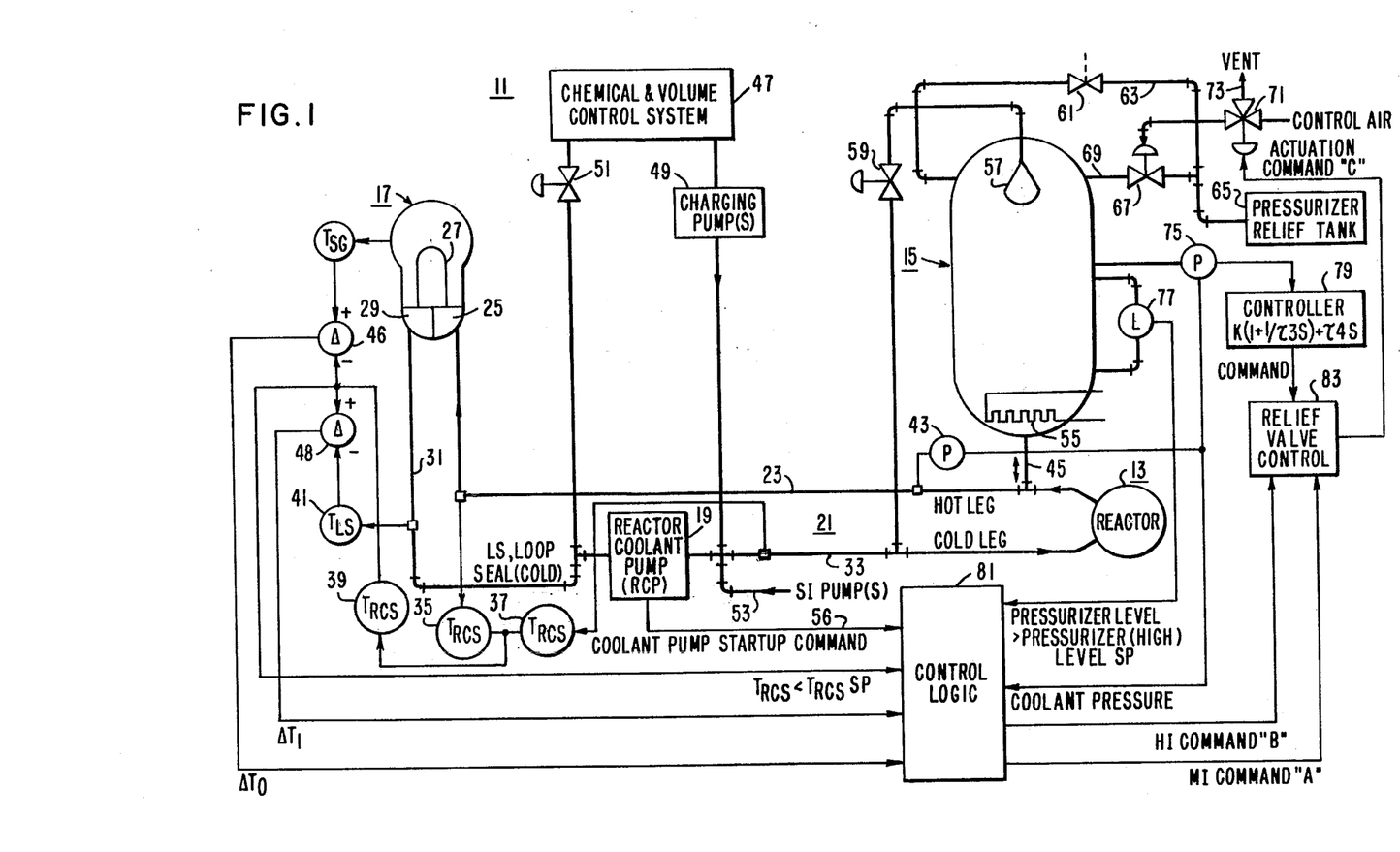
FIG. 1 is a diagrammatic view of nuclear-reactor power apparatus embodying the invention.

The apparatus shown in FIG. 1 is nuclear-reactor power apparatus 11. This apparatus includes a nuclear reactor 13, a pressurizer 15, and a steam generator 17. Reactor coolant is pumped through the reactor 13 by a pump 19. The coolant flows in a primary loop 21 extending from the reactor, though the hot leg 23, the inlet plenum 25 of the steam generator 17, the primary U-tubes 27 of the steam generator 17 (or straight through tubes), the outlet plenum 29 of the generator, the pump loop seal 31, the pump 19, the cold leg 33 of the loop, to the reactor. The steam generator 17 has a secondary system in heat-exchange relationship with the tubes 27 containing the reactor coolant which produces and conducts steam to the turbines (not shown) of the nuclear-reactor power apparatus. Instruments 35 and 37 are connected to the hot and cold legs 23 and 33 of loop 21. These instruments are connected to another instrument 39 which produces a measurement of the minimum temperature sensed by instruments 35 and 37. There is also an instrument 41 for measuring the temperature of the loop seal 31 and an instrument 43, connected to the hot leg for measuring the pressure of the coolant. The coolant flows into and out of the pressurizer 15 through a surge line 45 connected to the hot leg 23.

There is an adder 46 for producing a signal, $\Delta T_o$, measuring the difference $\Delta T_o$ between the temperature, $T_{SG}$, of the secondary fluid and the temperature $T_{RCS}$, of the coolant. $T_{RCS}$ is derived from instrument 39 which indicates the minimum temperature measured by instruments 35 and 37. There is also an adder 48 for measuring the difference, $\Delta T_1$, between $T_{RCS}$ and the temperature $T_{LS}$ of the pump loop seal measured by instrument 41. Where there are a plurality of steam-generator loops, $\Delta T_o$ and $\Delta T_1$, may be derived from each loop and used, with or without auctioneering, to control an equal number of valves or a lesser number of valves. The word auctioneering means the selection of a particular $\Delta T_o$ and $\Delta T_1$, which is the most limiting signal.

The nuclear reactor power apparatus 11 includes a conventional chemical and volume control system 47 which is connected to the coolant loop 21. The coolant loop 21 is supplemented from this system 47 by charging pump or pumps 49 which is connected to cold leg 33. Excessive coolant in loop 21 is dumped into this system from the loop seal 31 through valve 51 when this valve is opened. Coolant is also pumped into the cold leg 33 when necessary through the safety-injection line 53. A signal indicating when the pump 19 is started up is derived from the pump through line 56. Improper operation of the pump or pumps 49 or valve 51 or inadvertent supply of mass to the coolant through line 53 may produce a malfunction in the water-solid state of the apparatus 11.

The pressurizer 15 includes electrical heaters 55 for heating the coolant contained in the pressurizer under normal power conditions. Inadvertent operation of heater 55, while coolant is water solid, can also produce a heat input overpressure transient. There is also a nozzle 57 or a plurality of nozzles near the top of the pressurizer, connected to the cold leg 33 through a valve 59 for spraying coolant into the pressurizer under normal operating conditions. The pressurizer 15 is provided with a plurality of safety valves 61 (only one shown) which are interposed in safety lines 63 connecting the pressurizer to pressurizer relief tank 65. There is also a power-actuable relief valve or valves 67 which is interposed in a relief line 69 between the pressurizer and the tank 65. When the relief valve 67 is opened, steam or water from the pressurizer 15 is dumped into tank 65. Relief valve 67 is actuated by air which is supplied through solenoid valve 71. With solenoid valve 71 closed, air from relief valve 67 is vented through vent 73. When the solenoid is energized, vent 73 is closed and control air is injected through valve 71 to open relief valve 67.

Figure 9:
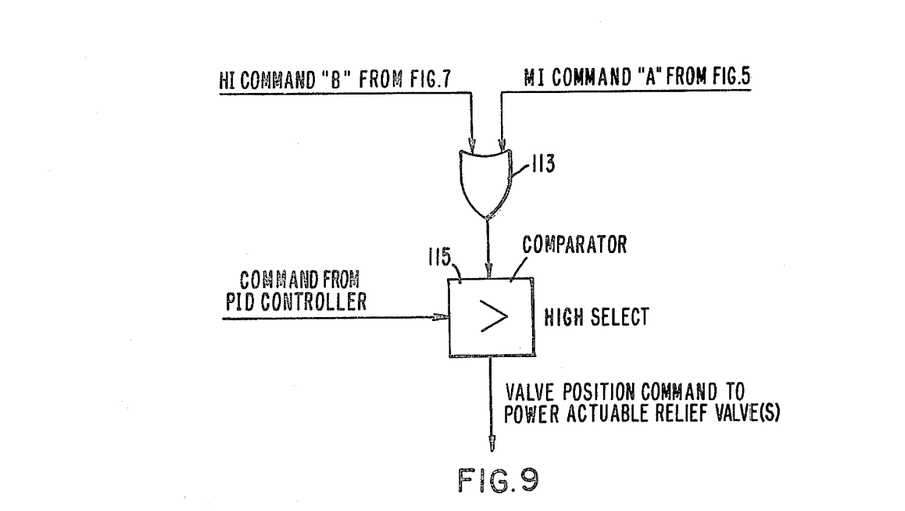
FIG. 9 is a logic schematic showing the manner in which the commands are impressed on the relief valve.

Instruments 75 and 77 are connected to the pressurizer to measure its pressure and the level of the coolant therein. The pressure measurement signal is impressed on a conventional proportional plus integral plus differential (PID) controller 79. This controller 79 transmits the conventional commands and also a command to control the power-actuable relief valve 67 (FIG. 9).

The nuclear power apparatus 11 according to this invention includes control logic 81 for controlling the power-actuable relief valve 67 when the apparatus is in water-solid condition. As indicated, this control logic 81 receives the temperature, pressure, level, pump start up, $\Delta T_o$, $\Delta T_1$ signals from the components of the apparatus which signals serve as criterians for the actuation of relief valve 67. Mass input command A and heat-input command B, derived from these signals, when they are produced, are transmitted to the relief valve control 83. The PID command from PID controller 79 is also impressed on this control 83. Under the command of the highest of signals A, B or PID, the control 83 energizes the solenoid valve 71 and the relief valve 67 with command C.

Figure 2:
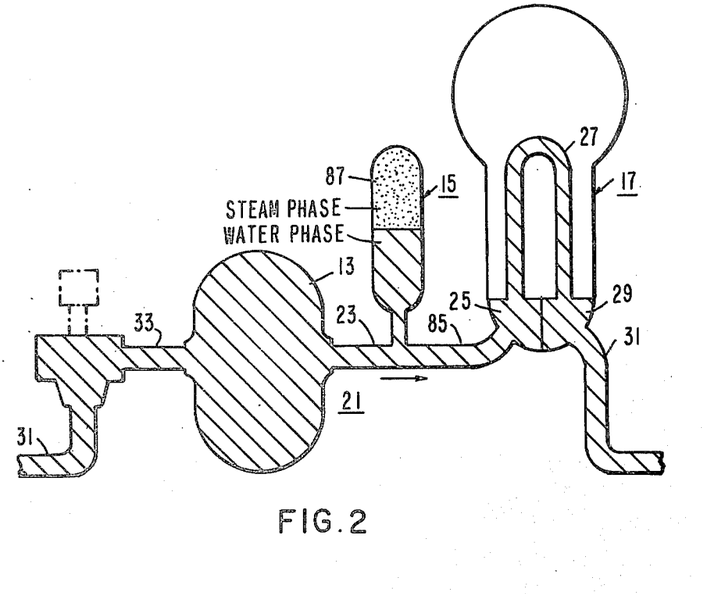
FIG. 2 is a fragmentary diagrammatic view of a nuclear reactor and associated components showing the status of the coolant and its vapor during normal operation.
Figure 3:
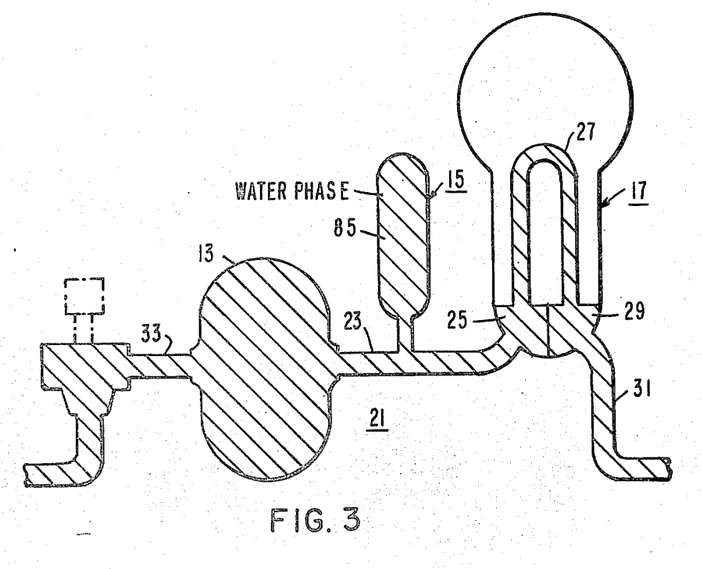
FIG. 3 is a like fragmentary view showing the status of the coolant with the apparatus in water-solid condition.

In FIGS. 2 and 3, coolant 85 is represented by cross-hatching and steam 87 by dots. As shown in FIG. 2 there is during normal operation a large steam bubble 87 above the level of the coolant in pressurizer 15. In the water-solid state the pressurizer is filled with coolant 85 as shown in FIG. 3 or the volume of the bubble is very small; i.e., the level of the water is above the setpoint.

Typically the reactor 13 supplies a plurality of steam generators. Each steam generator is supplied from a separate loop 21 including the components shown in FIG. 1 except for the pressurizer 15 and its components. The pressurizer is connected to hot leg of only one of the loops. Tyically the control logic 81, the relief-valve control 83 and the PID controller 79 are components of a computer.

Figure 4:
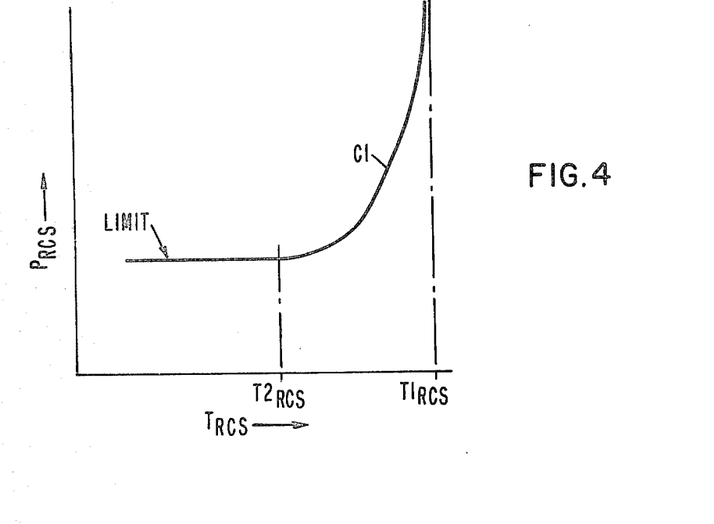
FIG. 4 is a typical graph showing the limiting reactor coolant pressure as a function of the reactor coolant temperature from start-up to normal running operation.

FIG. 4 shows the region of operation of the reactor apparatus 11 to which this invention is applicable. Coolant temperature, $T_{RCS}$, (the minimum coolant temperature) is plotted horizontally and coolant pressure, $P_{RCS}$, vertically. The curve C1 marks the coolant-pressure limit of reactor vessel 13 as defined by Appendix G; i.e., the pressure below which it is required that the apparatus operate at a corresponding coolant temperature. The curve C1 can be substantially flat below a temperature $T2_{RCS}$. This invention is applicable at all coolant temperatures below the setpoint $T1_{RCS}$ for which the limit of Appendix G must be observed. Above this temperature the conventional protective devices of the reactor power apparatus take over.

Figure 5:
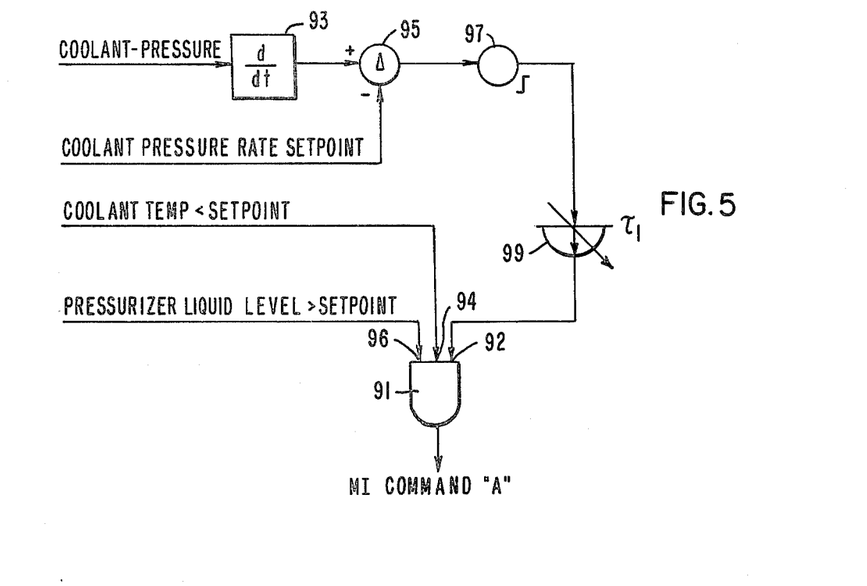
FIG. 5 is a logic schematic showing the manner in which the actuating command for the power-actuable relief valve, responsive to mass input, with the apparatus in water-solid condition, is derived.
Figure 6:
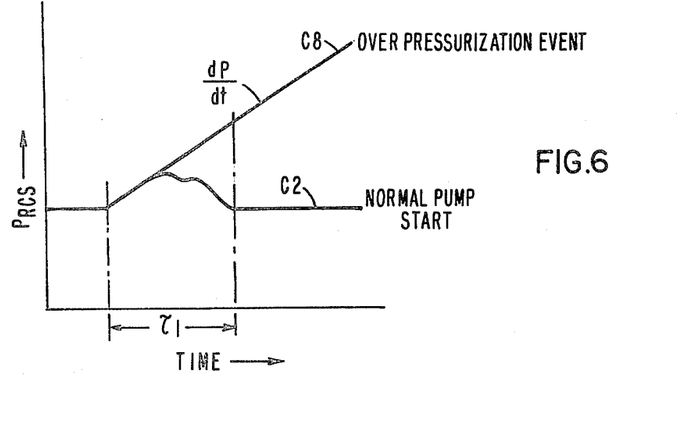
FIG. 6 is a graph showing the reactor-coolant pressure as a function of time which is used in explaining the operation of the logic shown in FIG. 5.

FIG. 5 shows the part of the control logic 81 (FIG. 1) from which the command A for actuating the power-actuable valve 67 for mass input is derived. The logic shown in FIG. 5 includes AND 91 which has inputs 92, 94, 96. The coolant-pressure signal is impressed on a time-derivative component 93 which derives the rate of change of pressure level anticipatory of overpressurization. The output of the time-derivative component 93 is impressed on an adder 95. The negative coolant pressure-rate setpoint is also impressed on this adder. If the coolant-pressure rate is positive, the difference between the coolant-pressure rate and the setpoint is impressed on a threshold gate 97 which passes a signal only if this difference becomes zero or exceeds a predetermined threshold. The signal from gate 97 is impressed on input 92 of AND 91 through a timer 99. The timer 99 is set to impress the signal on AND 91 only if it persists for a time interval $\tau_1$. The time $\tau_1$ is long enough to prevent actuation of the relief valve 67 for short, spurious transients. This is illustrated in FIG. 6. Time is plotted horizontally and coolant pressure vertically. The curve C2 for the pressure is seen to have a hump manifesting an increase in coolant pressure for short spurious transients. As shown, the interval $\tau_1$ starts when the pressure starts to increase. The rate of increase is the slope of the line labelled dP/dt. If dP/dt equals the setpoint or exceeds it by a threshold for an interval longer than $\tau_1$ the signal from gate 97 is impressed on AND 91. For curve C2 as illustrated by FIG. 6, the rate dP/dt is not positive for the interval $\tau_1$ and the signal would not be impressed on AND 91. For curve C8, (FIG. 6), the rate dp/dt is positive for a time greater than interval $\tau_1$ and the signal wound be impressed on AND 91.

Another signal is impressed on input 94 of AND 91 if the coolant temperature is less than a setpoint. If this temperature exceeds the setpoint, the apparatus is in normal operation and coolant pressure is monitored by the conventional monitoring components of the nuclear power apparatus 11. A third signal is impressed on input 96 of AND 91 if the pressurizer liquid coolant level is above a setpoint; i.e. if a water solid condition potentially exists. If all these signals and signal 92 are impressed, AND 91 outputs a command A to the relief valve control 83 to actuate relief valve 67.

Figure 7:
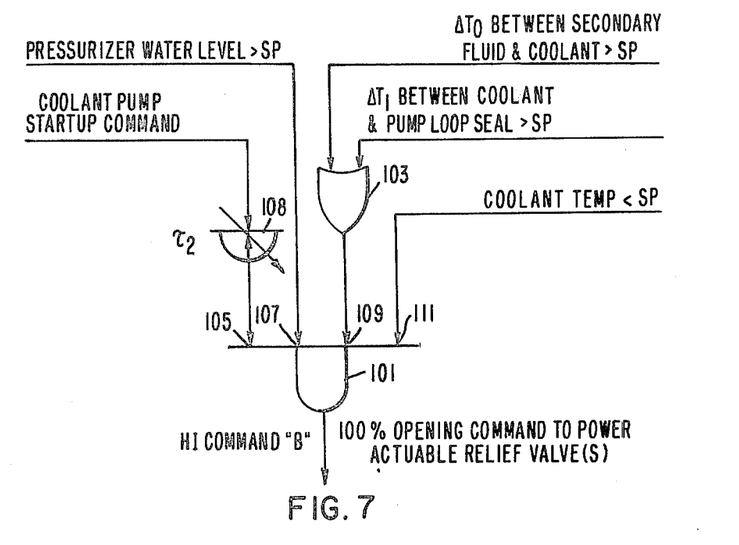
FIG. 7 is a logic schematic showing the manner in which the actuating command for the power-actuable relief valve, responsive to heat input, with the apparatus in water-solid condition, is derived.
Figure 8:
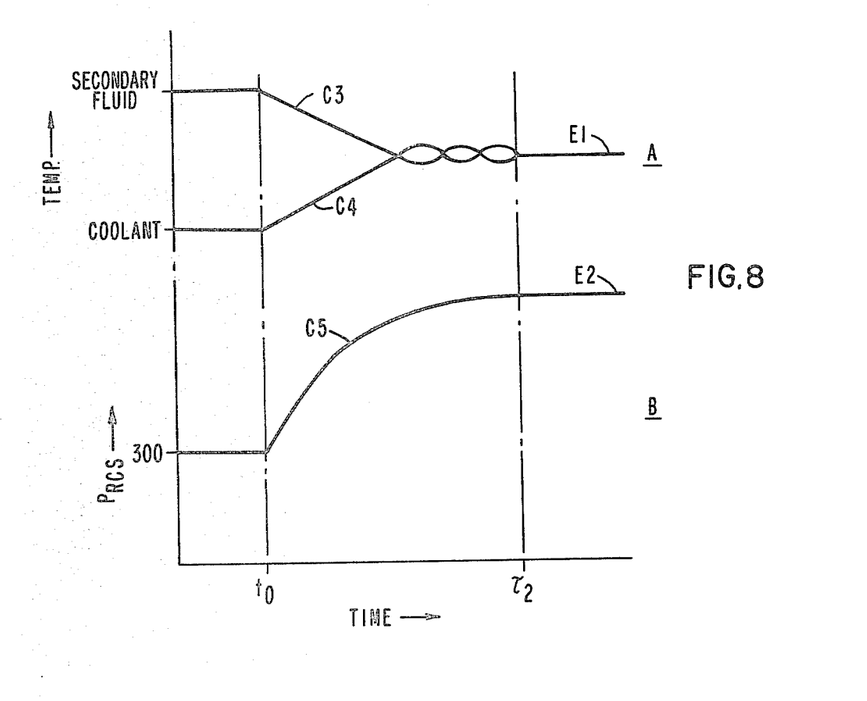
FIGS. 8A and 8B are related graphs, FIG. 8A showing the related temperatures of the secondary and of the coolant as a function of time during start-up from a sporadic shutdown and FIG. 8B showing the related coolant pressure as a function of time.

FIG. 7 shows the logic, included in control logic 81 (FIG. 1), for actuating the relief valve 67 for excessive heat input (HI) into the coolant. FIGS. 8A and 8B show the effects on coolant temperature and coolant pressure of typical heat input into the coolant during a reactor-coolant pump start-up with secondary fluid temperature at times greater than primary coolant temperatures. In both views time is plotted horizontally. The intersection of any vertical line with the time axes of FIGS. 8A and 8B marks the same instant of time for both graphs. In FIG. 8A temperature is plotted vertically. Curve C3 represents the temperature of the secondary fluid and curve C4 the temperature of the coolant. In FIG. 8B coolant pressure is plotted vertically; the pressure follows curve C5.

It is assumed that prior to $t_0$, the apparatus 11 was shut down and put into a water-solid configuration after the load on this apparatus was removed. In proceeding to complete shut down of the apparatus, the coolant cools at a higher rate than the secondary fluid. Prior to coolant pump startup, at instant $t_0$, the secondary fluid is at a higher temperature than the coolant as shown by curves C3 and C4 in FIG. 8A. With pump startup, coolant flows into the primary tubes of the warmer steam generator promoting flow of heat from the secondary fluid into the coolant. The pressure of the coolant increases as shown by curve C5 of FIG. 8A. The interchange of heat between the secondary fluid and the coolant continues until the system reaches equilibrium as shown by the ends E1 and E2 of curves C3 and C4 and C5.

The invention involves the operation of the apparatus 11 prior to stabilization or equalization of secondary and coolant temperatures. If the pump 19 is enabled at time $t_0$ under the temperature conditions shown in FIG. 8A, there is potential for overpressurization.

The apparatus shown in FIG. 7 includes an AND 101 having inputs 105, 107, 109 and 111 and an OR 103 having at least two inputs. AND 101 operates as a gate which can pass its signal, for 107, 109, 111 "high" or 1, only if there is an appropriate signal (a "high" or 1) on input 105. This input 105 receives an appropriate signal 56 (FIG. 1) from pump 19 (FIG. 1) when it starts. The signal is impressed through timer 108. Timer 108 permits the appropriate signal to be impressed only during the interval $\tau_2$. This interval $\tau_2$ is the interval between $t_0$ (FIGS. 8A, 8B), the time of startup and the time when apparatus 11 reaches the equilibrium state represented by ends E1 and E2 of curves C3, C4, C5.

Assuming that there is an appropriate signal on input 105, three additional conditions must be met to produce a command B to actuate relief valve 67 responsive to heat input. A signal (1 or "high") is impressed on input 107 if the pressurizer coolant level exceeds the setpoint; i.e., if apparatus 11 is potentially in water-solid state. A signal (1 or "high") is impressed on input 109 through OR 103 either if the temperature difference $\Delta T_o$, namely, the temperature of the secondary fluid (C3 FIG. 8A) less the temperature of the coolant (C4), is greater than a setpoint or if the temperature difference $\Delta T_1$, namely, the temperature of the coolant $T_{RCS}$ (FIG. 1) less the temperature of the pump loop seal 31, is greater than a setpoint. An appropriate signal is impressed on input 111 if the coolant temperature is less than a setpoint. If inputs 107, 109 and 111 receive appropriate signals while there is an appropriate signal on 105, AND 101 produces a heat input (HI) command B output and relief valve 67 is opened.

Commands A or B impress a command to open relief valve 67 through OR 113 and comparator 115 (FIG. 9). Commands A or B or both are impressed on comparator 115. In addition the command from the PID controller is impressed on the comparator. The comparator transmits a command to actuate the relieve valve for the highest command impressed on it.

While a preferred embodiment of this invention has been disclosed herein, many modifications thereof are feasible. This invention is not to be restricted except insofar as is necessitated by the spirit of the prior art.

We claim:

1. The method of suppressing malfunction in the operation of a nuclear-reactor power apparatus, while in a water-solid condition; the said apparatus having a primary-coolant system, steam generator means supplied with the primary coolant, and having means conducting a secondary coolant in heat-exchange relationship with said primary coolant, a pressurizer connected to said primary-coolant system and a power-actuable relief valve for relieving excessive pressure in said primary coolant; the said method comprising, determining the primary-coolant mass input to said primary coolant, determining the heat input to said primary coolant, and responsive either, to mass input tending to increase the pressure in said primary coolant above undesired limits, or to heat input tending to increase the pressure in said primary coolant above undesired limits, actuating said relief valve to relieve the pressure in said primary coolant.

2. The method of suppressing malfunction in the operation of a nuclear-reactor power apparatus, while in water-solid condition; the said apparatus having a primary-coolant system, steam generator means supplied with the primary coolant, and having means conducting a secondary coolant in heat-exchange relationship with said primary coolant, a pressurizer connected to said primary-coolant system and a power-actuable relief valve for relieving excessive pressure in said primary coolant; the said method comprising, determining the primary-coolant mass input to said primary coolant, and responsive to mass input tending to increase the pressure in said primary coolant above undesired limits, actuating said relief valve to relieve the pressure in said primary coolant.

3. The method of suppressing malfunction in the operation of a nuclear-reactor power apparatus, while in water solid condition; the said apparatus having a primary-coolant system, steam generator means supplied with the primary coolant, and having means conducting a secondary coolant in heat-exchange relationship with said primary coolant, a pressurizer connected to said primary-coolant system and a power-actuable relief valve for relieving excessive pressure in said primary coolant; the said method comprising, determining the heat input to said primary coolant, and responsive to heat input tending to increase the pressure in said primary coolant above undesired limits, actuating said relief valve to relieve the pressure in said primary coolant.

4. The method of claim 2 including the steps of determining the rate of increase of pressure in the primary coolant, the temperature of the primary coolant, and the level of fluid in the pressurizer, and actuating the power-actuable relief valve responsive to primary-coolant mass input only if said rate of increase of pressure exceeds a predetermined setpoint, said primary-coolant temperature is less than a predetermined setpoint, and said level is greater than a predetermined setpoint.

5. The method of claim 4 wherein the power-actuable relief valve is actuated only if the rate of increase of pressure in the primary coolant exceeds the setpoint at least for a predetermined time interval sufficient to prevent actuation for normal transients.

6. The method of claim 3 including the steps of determining the pressurizer liquid level, the temperature difference between the secondary fluid and primary coolant, the temperature difference between the primary coolant outside of the loop seal and the primary coolant within the pump loop-seal and actuating the power-actuable relief valve responsive to heat input only if
(a) said pressurizer liquid level exceeds a predetermined setpoint,
(b1) said secondary-fluid temperature exceeds said primary-coolant temperature by a predetermined setpoint magnitude or,
(b2) said primary coolant temperature outside of the loop-seal exceeds the pump-loop seal temperature by a predetermined setpoint magnitude, and
(c) the primary coolant temperature is less than a setpoint.

7. The method of claim 6 wherein the power-actuable relief valve is actuable if all the conditions (a), (b1) or (b2), and (c) continue throughout a predetermined time interval after the coolant pump is started and is not actuable after said interval, said interval being sufficient to enable the said apparatus to stabilize.

8. A nuclear-reactor power apparatus including a nuclear reactor, at least one steam-generator, a primary loop passing through said reactor in heat exchange relationship therewith and through said steam generator, a pressurizer connected to said primary loop, pump means connected to said primary loop for transmitting reactor coolant through said loop, a secondary loop in said steam-generator means in heat-exchange relationship with said primary loop, means for controlling the supply of coolant to said primary loop, a power-actuable relief valve for relieving the pressure of the coolant in said primary loop, and means, actuable only when said apparatus is in or near a water-solid condition, responsive to a predetermined rate of increase in pressure in said primary loop by reason of increase in the coolant supplied to said primary loop for actuating said power-actuable relief valve.

9. The apparatus of claim 8 including timing means for preventing the actuation of the power-actuable relief valve unless the increase in the coolant supplied to the primary loop has persisted for at least a predetermined interval of time.

10. A nuclear-reactor power apparatus including a nuclear reactor, at least one steam-generator, a primary loop passing through said reactor in heat exchange relationship therewith and through said steam generator, a pressurizer connected to said primary loop, pump means connected to said primary loop for transmitting reactor coolant through said loop, a secondary loop in said steam-generator in heat-exchange relationship with said primary loop, means for controlling the supply of coolant to said primary loop, a power-actuable relief valve for relieving the pressure of the coolant in said primary loop, and means, actuable only when said apparatus is in or near a water-solid condition, responsive to a predetermined increase in pressure in said primary loop by reason of supply of heat to said primary loop for actuating said power-actuable relief valve.

11. The apparatus of claim 10 including means responsive to the pump means for actuating the power-actuable relief valve if the increase in heat supplied to the primary loop persists throughout a predetermined time interval after the pump is started and is not actuable thereafter, said interval being sufficient to afford the apparatus time to stabilize.

12. The apparatus of claim 8 including means, connected to the coolant, for determining the rate of change of pressure in said coolant, means, connected to the coolant, for determining the temperature of said coolant, and means, connected to the pressurizer, for determining the level of liquid in said pressurizer, the said apparatus also including means, connected to the pressure-rate determining means, the temperature determining means, the level determining means, and the power-actuable relief valve, for actuating said relief valve during water solid conditions only if
(a) said rate of change of pressure exceeds a predetermined setpoint;
(b) said temperature is less than a predetermined setpoint; and
(c) said level exceeds a predetermined setpoint.

13. The apparatus of claim 12 including timing means interposed between the rate-of-change of the pressure determining means and the power-actuable relief valve for preventing actuation of said relief valve unless the rate-of-change of pressure exceeding the setpoint persists at at least a predetermined interval of time to prevent operation during normal transients.

14. The apparatus of claim 10 including
(a) means, connected to the pressurizer, for determining the level of fluid in said pressurizer,
(b1) means, connected to the secondary loop and to the primary loop, for determining the difference in temperature between the fluid in the secondary loop and the coolant,
(b2) means, connected to the primary loop out of the region of the pump-loop seal and to the primary loop in the region of the pump-loop seal, for determining the difference in temperature between the coolant out of the region of the pump-loop seal and the coolant in the region of said pump-loop seal, and
(c) means, connected to the coolant for determining the temperature of the coolant, the said apparatus also including means, connected to said means (a), (b1), (b2) and (c) and to the power-actuable relief valve for actuating the relief valve during water-solid conditions only if:
(d) the primary coolant pump is in operation;
(e) the level of coolant in said pressurizer exceeds a predetermined setpoint;
(f1) the temperature of the secondary fluid exceeds the temperature of the coolant by a predetermined setpoint magnitude, or
(f2) the temperature of the coolant out of the pump-loop seal exceeds the temperature in the coolant within the pump-loop seal by a predetermined setpoint magnitude; and
(g) the temperature of the coolant is less than a predetermined setpoint.

15. The apparatus of claim 14 including timing means interposed between the cooling pump and the relief-valve-actuating means permitting actuation of said relief valve on the persistence of conditions (d), (e), (f) or (f2), and (g) only if said pump has continued in operation throughout a predetermined time interval after starting during water-solid conditions.

16. A nuclear-reactor power apparatus including a nuclear reactor at least one steam-generator, a primary loop passing through said reactor in heat exchange relationship therewith and through said steam generator, a pressurizer connected to said primary loop, pump means connected to said primary loop for transmitting reactor coolant through said loop, a secondary loop in said steam-generator in heat-exchange relationship with said primary loop, means for supplying coolant to said primary loop, a power-actuable relief valve for relieving the pressure of the coolant in said primary loop, means, actuable only when said apparatus is in or near a water-solid condition, responsive to a predetermined increase in pressure in said primary loop by reason of increase in the coolant supplied to said primary loop, for actuating said power-actuable relief valve and means, actuable only when the apparatus is in water-solid condition, responsive to a predetermined increase in the heat to said primary loop, for actuating said power-actuable relief valve.

* * * * *